March 18, 1958 J. L. NOCK ET AL 2,827,315
STRUCTURAL TUBES AND SIMILAR ELEMENTS
Filed Nov. 10, 1954
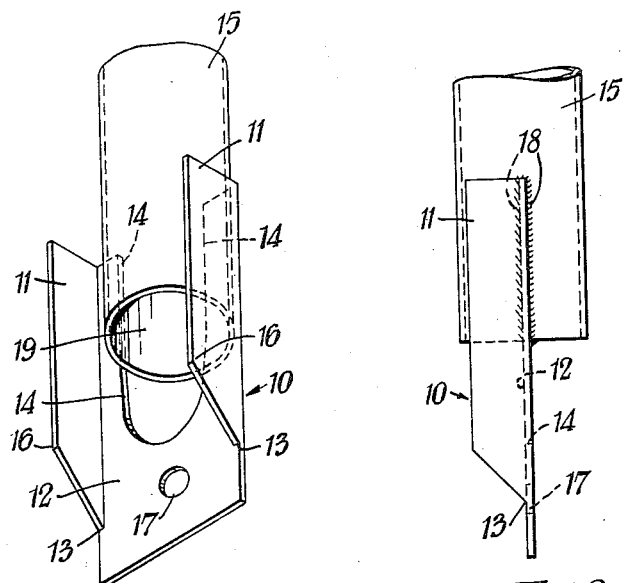
FIG. 1.
FIG. 2.
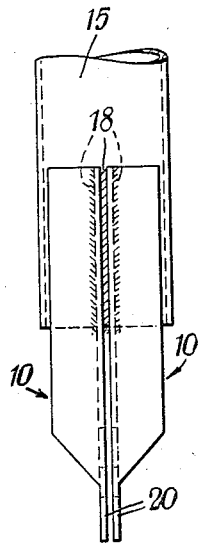
FIG. 3.
Inventors,
JAMES LEE NOCK,
HARRY WEATHERALL
by Sommers & Young
Attorneys United States Patent Office 2,827,315
Patented Mar. 18, 1958

2,827,315

STRUCTURAL TUBES AND SIMILAR ELEMENTS

James L. Nock, Lugwardine, Hereford, and Harry Weatherall, Hereford, England, assignors to Painter Brothers Limited, Hereford, England Application November 10, 1954, Serial No. 468,132

Claims priority, application Great Britain May 21, 1954

2 Claims. (Cl. 287—20.2)

This invention relates to end and like connections for galvanised structural tubes and similar elements.

It is known that the galvanising of closed tubes and the like is dangerous owing to the possibility of the pickling acid penetrating to the inside of the tubes.

Closed-ended tubes have a wide variety of applications for structural purposes and the ends have been flattened to enable the tubes to be connected to other tubes or structural elements.

An important object of the present invention is to provide an end connection for tubular and like structural members which is suitable for the galvanising process and yet avoids the danger referred to above.

According to the invention, an end or like connection for a metal tube or similar element, comprises a part of channel section and a terminal part extending from and integral with the channel-section part, the latter being slotted over a portion of its length remote from the terminal part so that it can fit on to an end of the tube or the like and be secured externally thereto, e. g. by welding where the two fit together, and the channel-section part being further constructed to allow the tube or the like to have an open adjacent end.

It will be realised that the end or like connection of the invention will allow free flow for molten galvanising metal inside the bore of open-ended tubes so that the danger referred to is advantageously avoided.

In order to enable the invention to be readily understood, reference is directed to the accompanying drawing in which:

Figure 1 is a perspective view showing one construction of the end connection applied to a metal tube end, Figure 2 a side elevation thereof, and Figure 3 a side view illustrating a construction embodying two of the end connections applied to a single tube end.

The construction illustrated in Figures 1 and 2, consists of a channel-form pressing 10 of mild steel which is blanked out so that the channel sides 11, preferably disposed at right-angles to the flat bottom 12 of the channel, end short of one end thereof, as at 13, so that the bottom at that end constitutes the terminal part of the connection. The channel constitutes the trough-section part of the connection and, within it, the bottom 12 is slotted down the middle at 14, the slot being as wide as the end of a tube 15 to which the connection is to be applied. The slot 14 opens into the end of the connection remote from the terminal part and extends a little more than three-quarters the length of the channel sides 11 which are inclined (as shown), or may be rounded, down to the terminal part from points 16 which are about aligned with the closed end of the slot which is suitably formed semi-circular or semi-elliptical. About on a line across the adjacent ends 13 of the channel sides, there is a hole 17 in the terminal part for a connecting bolt or screw. By means of the slot 14, the connection 10 can fit externally on to the end of the tube 15 which may be of circular (as shown) or other section. The tube would be extended within the slot 14 for an appropriate distance, the flat bottom 12 of the channel lying in the plane of the axis of the tube. On being thus applied to the tube, the two are welded together at 18 where the sides of the slot 14 embrace the end of the tube 15. This connection 10 is of a shape such as can provide a stiff form right up to the hole 17 for the connecting bolt or screw by which the tube 15 is to be connected to an adjacent member. Moreover, as the tube 15 is open at its end (cf. 19 in Figure 1), and the slot 14 extends beyond this open end, free flow for molten galvanising metal is provided for inside the bore of the tube so that the danger above referred to can be avoided. At the same time, the terminal part being flat, provides quite as good, if not a more efficient, means for connecting the tube to another tube or other element as or than an ordinary flattened tube end. The dimensions of the channel pressing 10 may, of course, be varied to suit requirements.

It is believed that the use of the end connection above described with reference to the drawing will be understood without further description. However, the invention is not limited to this particular construction, as modifications are possible without departing from the scope of the present improvements as will be understood. In Figure 3 of the drawing indication is given that two of the end connections of construction substantially similar to that shown in Figures 1 and 2, can be applied at opposite sides of the end of a tube. Similar reference numerals are used in these several figures for convenience. As will be seen, the connections 10, 10 are spaced apart so that the terminal parts provide a sort of bifurcated end 20 on the tube 2 which is useful for some purposes, while still leaving access to the adjacent open end of the tube for the purpose described. In some cases, a set of more than two end or like connections according to the invention may be applied around an end of a tube so long as access is left to open end of the tube for the purpose described.

The invention includes within its scope tubes or similar elements fitted with one or more of the end or like connections, and such combinations can readily be galvanised without danger from imprisoned pickling acid as will be understood.

Tubes or the like and end or like connections therefor as described are of advantageous use in the construction of openwork or lattice type masts, poles and towers.

We claim:

1. An end or like connection for a metal tube or similar element comprising a part of channel section having a substantially plane bottom formed with a slot extending along a portion of its length from one end so that it can fit by its edges which border said slot onto an end of said element and be secured externally thereto by welding at said edges, and a terminal connection part extending coplanar from and integral with said bottom of the channel-section part remote from the slotted end thereof, said slot in the bottom of the channel section part extending beyond the end of said element to allow said element to have an open adjacent end.

2. An end or like connection according to claim 1 welded to said element at said end thereof, the bottom of the channel-section part lying substantially in a plane containing the axis of said element.

References Cited in the file of this patent

UNITED STATES PATENTS

| | | |
|---|---|---|
| 629,185 | Arnold | July 18, 1899 |
| 1,100,029 | Severns | June 16, 1914 |
| 1,524,295 | Erickson | Jan. 27, 1925 |
| 1,642,981 | Weiss et al. | Sept. 20, 1927 |
| 1,956,142 | Brohasek et al. | Apr. 24, 1934 |
| 2,480,958 | Pietzsch | Sept. 6, 1949 |